UNITED STATES PATENT OFFICE.

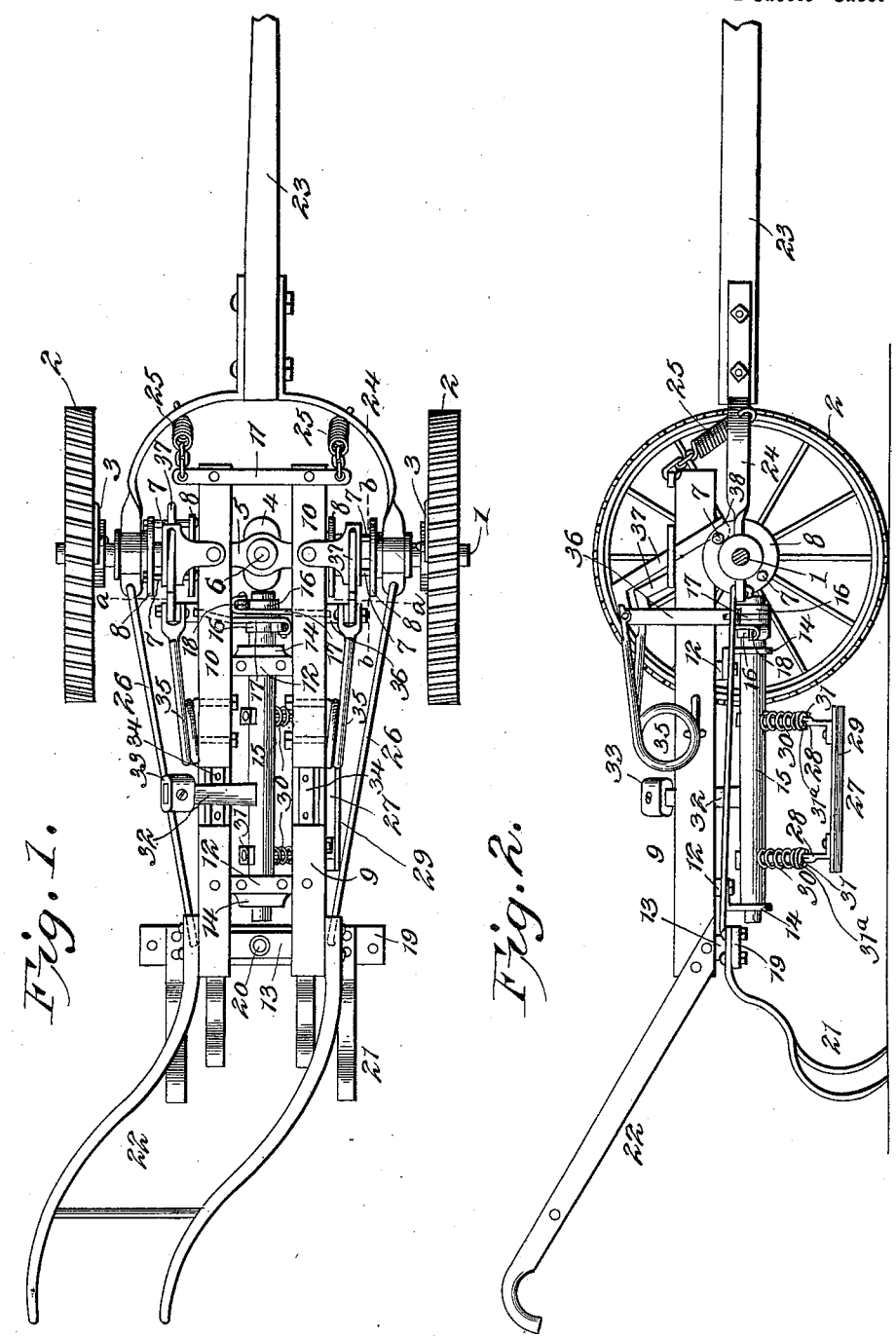

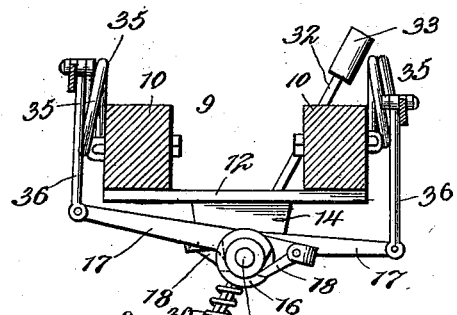

NINIAN S. McCRACKEN, OF UNION, TEXAS.

COTTON CHOPPER AND CULTIVATOR.

SPECIFICATION forming part of Letters Patent No. 658,959, dated October 2, 1900.

Application filed July 24, 1900. Serial No. 24,685. (No model.)

*To all whom it may concern:*

Be it known that I, NINIAN S. MCCRACKEN, a citizen of the United States, residing at Union, in the county of Wilson and State of Texas, have invented a new and useful Cotton Chopper and Cultivator, of which the following is a specification.

My invention is an improved combined cotton chopper and cultivator; and it consists in the peculiar construction and combination of devices hereinafter fully set forth, and pointed out in the claims.

In the accompanying drawings, Figure 1 is a top plan view of a combined cotton chopper and cultivator embodying my improvements. Fig. 2 is a side elevation of the same with the near wheel removed. Fig. 3 is a detail view of the rock-shaft, its ratchets, actuating-levers and dogs, taken on the line $a\,a$ of Fig. 1. Fig. 4 is a detail perspective view of the same. Fig. 5 is a detail sectional view taken on the line $b\,b$ of Fig. 1.

The axle-shaft 1 is provided on its ends with traction-wheels 2, which are loose thereon and connected thereto by means of pawl-and-ratchet mechanisms 3 of the usual construction. Thereby the said axle-shaft is revoluble with the said traction-wheels and each of the latter is free to turn independently thereon. A boxing 4 is swiveled centrally on the axle-shaft, and a bolster 5 is pivotally mounted on said boxing by a bolt or pin 6. Tappets 7 are carried between two pairs of disks 8, which are fast on the axle-shafts near the ends thereof, and the said tappets at the respective ends of the shaft are disposed at right angles to each other. A frame 9 extends rearward from the axle-shaft. The said frame is composed of a pair of side bars 10, a cross-bar 11, which connects their front ends, a pair of cross-bars 12, which are disposed between the axle-shaft and the rear ends of the frame 9, and a cross-bar 13, which connects the rear ends of the bars 10. Bearing-blocks 14 depend from the cross-bars 12, and in said bearing-blocks is journaled a rock-shaft 15. The latter is provided at its front end with a pair of reversely-arranged ratchets 16, and a pair of levers 17 are fulcrumed on said rock-shaft and provided at their inner ends with dogs 18, which are adapted to engage the said ratchets. A beam 19, which is transversely disposed under the rear end of the frame 9, has its central portion provided with an opening in which is a pivotal bolt 20, that depends from the center of the cross-bar 13. Said transversely-disposed beam serves for the attachment thereto, near its ends, of spring cultivating-teeth 21. Any other preferred form of cultivating-teeth may, however, be used in lieu of the teeth 21. A pair of handle-levers 22 are attached to the rear end of the side bars 10 and are obliquely disposed, so that the plowman may walk on one side of the row that is being chopped and cultivated. The draft-tongue 23 has its hounds 24 pivotally attached to the axle-shaft, and supporting-springs 25 are attached to the said hound and to the ends of the cross-bar 11 at the front corners of frame 9. Rods or chains 25 connect the beam 19 near the ends thereof with the said hounds.

From the foregoing description and by reference to the drawings it will be understood that the frame 9 may be swung laterally at its rear end without turning the axle-shaft, and hence the cultivating-teeth may be directed by the plowman in other than right lines to compensate for irregularities in the cotton-rows. It will be further understood that the supporting-springs 25, which connect the front portions of frame 9 to the hounds, and the rods or chains 26, which connect the hounds to the transversely-disposed beam 19, serve to support the weight of the rear portion of frame 9 and of the cultivating-teeth and correspondingly lessen the labor of the plowman.

A chopping-hoe 27 is carried by the rock-shaft 15. The said hoe comprises a pair of arms 28, which extend through and project radially from the rock-shaft, and a blade 29, which is double-edged and serves to connect said arms 29. By adjusting the latter the blade may be adjusted toward or from the rock-shaft, as may be required, and hence the depth of the cut thereof may be regulated. As here shown, I provide coacting springs 30, collars 31, and pins $31^a$, which are adjustable on the arms 28 on opposite sides of the rock-shaft to effect the adjustment of the chopping-hoe. The blade may be of any suitable length. A counterbalancing-lever 32 extends from the side of the rock-shaft opposite the chopping-hoe, and said lever is provided with a weight 33. The function of the said weighted lever is to impart momentum to the chopping-hoe when the rock-shaft is actuated, as will be understood. Buffers 34, which may be of rubber or other suitable material or of any suitable construction, are secured on the opposing sides of the side bars 10 of frame 9 and serve to arrest the lever 32 and limit the strokes of the chopping-hoe. The levers 17 on the strokes thereof which by engagement of the dogs 18 with the ratchet 16 serve to actuate the rock-shaft, and thereby operate the chopping-hoe, are actuated by springs 35, which are attached to sides of frame 10 and connected to the outer ends of the levers 17 by links 36. Operating-links 37 have their upper ends pivotally attached to the free ends of the springs 35, and said links are provided at their lower ends with shoulders 38, which are adapted to be engaged by the tappets 7, carried by the revoluble axle-shaft. It will be understood that as the axle-shaft rotates the tappets alternately engage and disengage the shoulders 38 of the links 37, thereby alternately drawing downward on said links 37 to depress the arms of springs 35 and operate the levers 17, so as to engage the dogs 18 with the ratchets 16, and as the tappets 7 clear the shoulders 38 of links 37 and release the latter the springs 35 operate the levers 17 and actuate the rock-shafts and chopping-hoe, the links 37 being carried upward by the said springs 35 in position to be reëngaged by the next succeeding tappet. Owing to the fact that the tappets on the respective ends of the axle-shaft are disposed at right angles to each other the links 37 are drawn downward alternately, and hence the levers 17 are alternately operated, one of said levers throwing the chopping-hoe in one direction and the other throwing the chopping-hoe in the opposite direction.

Having thus described my invention, I claim—

1. In a cotton-chopper, the combination of a rock-shaft, having a chopping-hoe and reversely-arranged ratchets, levers having dogs to engage said ratchets, springs to move said levers in one direction, links connected to said levers and revoluble power elements adapted to engage and impart longitudinal movement to and disengage said links, substantially as described.

2. In a cotton-chopper, the combination of a rock-shaft, having a chopping-hoe, a weighted lever projecting from the sides of the rock-shaft opposite said chopping-hoe and means to actuate the rock-shaft, substantially as described.

3. In a cotton-chopper the combination of an axle-shaft, a rearward-extending frame on which said axle-shaft turns, said frame carrying the chopping mechanism, a cross-bar pivoted to the rear of said frame and to which the cultivating-teeth are attached, and connections between the ends of said pivoted cross-bar and said axle, substantially as described.

4. In a cotton-chopper, the combination of an axle, a draft-tongue having the hounds pivoted on the axle, a rearward-extending frame provided with the chopping mechanism and the cultivating-teeth, supporting-springs attached to the said frame and said hound, and connections between said hounds and the rear end of said frame, substantially as described.

In testimony that I claim the foregoing as my own I have hereto affixed my signature in the presence of two witnesses.

NINIAN S. McCRACKEN.

Witnesses:
  W. H. McDONALD,
  E. S. HUDSON.